Patented Feb. 1, 1938

2,106,879

UNITED STATES PATENT OFFICE 2,106,879

CERAMIC GLAZING COMPOSITION

Edward R. Stowell, Fort Wayne, Ind., assignor of one-half to Worthington Hoyt, Cleveland, Heights, Ohio No Drawing. Application June 19, 1936,
Serial No. 86,084

5 Claims. (Cl. 106—36.2)

This invention relates to a glaze or enamel for ceramic products, such as fire bricks and the like to be used for refractory and acid resisting purposes.

The principal object is to produce a glaze or enamel on the surface of such ceramic product which when heated will become as hard as the surface to which it is applied, which will not chip off, which will remain hard, resist abrasion and mechanical injury to a great extent, and will not soften or adhere to ash or clinkers even at temperatures in excess of 3000° F., which will resist sudden and wide changes in temperature without cracking or chipping and which will be immune to the action of acids, sulphides, ammonia, chlorine, etc.

It is a further object to produce a "slip" which can be applied by troweling, brushing, spraying or dipping, which will dry quickly without cracking or peeling, which will consist of a body of non-fluxing character and a vehicle containing a fluxing agent and an agent capable of giving "green strength" and adhesive value to the undried glaze, and which upon drying will not crack and will melt only at temperatures in excess of 3000° F.

The foregoing objects can be realized by bringing together the "body" consisting of silicon carbide fines (50 mesh or finer) and containing a suitable quantity of free silica with a suitable quantity of a sodium silicate of high soda content (believed to be $Na_2SiO_3.5H_2O$) with sufficient water to form a stiff dough, allowing a reaction to proceed whereby the free silica combines with the soda of the high soda silicate to form a substance having the desired characteristics. For the purpose of facilitating application to the surface to be coated and imparting green strength and adhesiveness to the "slip", a suitable quantity of a sodium silicate having a high silica content is added together with a quantity of water to impart proper consistency to the mix.

While it is possible to mix the finely divided silicon carbide and finely divided silica, I prefer to use a commercial product which is available consisting principally of silicon carbide fines, but containing silica as an impurity to the extent of about 9%. The sodium silicate pentahydrate is readily soluble in cold water (or hot water) while being relatively nonviscous as compared with ordinary sodium silicate and I prefer to prepare a mixture of the body portion with this compound and water and allow the reaction to become completed before adding the ordinary sodium silicate solution and the final amount of water, the ordinary silicate being viscous and added for the purpose of giving green strength to the composition and for imparting rapid drying qualities thereto. This latter silicate is added in dry form.

One example of the composition is given as follows:

| | | |
|---|---|---|
| Silicon carbide | 95% to 88% | |
| Silica (preferably contained in the silicon carbide) | 5% to 12% | 98% to 97% |
| Sodium silicate ($Na_2O$, $SiO_2$ ratio 1:1) | 2% to 3% | 98% to 90% |
| Water sufficient to produce a dough | | |
| Sodium silicate ($Na_2O$, $SiO_2$ ratio 1:2) (powder) | 2% to 10% | |
| Water sufficient to give desired consistency | | |

In the above example, the ingredients with the exception of the last two are brought together and allowed to react, after which the ordinary silicate is added in the dry form and the resulting slip reduced to the desired consistency with such quantity of additional water as is required. The reaction takes place suitably in the cold, that is, from 50° F. to about 110° F., and is complete in approximately 3 to 4 hours. Where thicker films are to be applied more of the ordinary viscous silicate is employed; for thin films less, as indicated.

Having thus described my invention, what I claim is:

1. A process of making a "slip" for glazing ceramics, comprising bringing together a major portion of finely divided silicon carbide with a small proportion of finely divided silica and a small proporton of a sodium silicate compound of relatively low viscosity and water, allowing the silica to react with the silicate and finally adding a sodium silicate compound of relatively high viscosity and water sufficient to reduce the mass to a suitable consistency for brushing, spraying or dipping.

2. A process of making a "slip" for glazing ceramics, comprising bringing together a quantity of silicon carbide containing about 5% to 12% of free silica with about two to three percent of its weight of sodium silicate of $Na_2O$, $SiO_2$, ratio approximately 1:1, and water sufficient to form a doughy mass, allowing the reaction between such silicate and free silica to become complete, adding about two to ten percent of sodium silicate of $Na_2O$, $SiO_2$ ratio approximately 1:2, in dry form, and water sufficient to reduce the mass to a suitable consistency for brushing, spraying or dipping, but not exceeding one third of the total weight of the mixture.

3. A process of making a "slip" for glazing ceramics, comprising bringing together a quantity of silicon carbide containing about 5% to 12% of free silica with about two to three percent of its weight of sodium silicate of relatively high soda content and water sufficient to form a doughy mass, allowing the reaction between such silicate and free silica to become complete, adding in dry form about two to ten percent of sodium silicate of relatively low soda content and water sufficient to reduce the mass to a suitable consistency for brushing, spraying or dipping.

4. A "slip" for glazing ceramics comprising the reaction product of silicon carbide and free silica, finely divided and thoroughly admixed with sodium silicate of relatively high soda content, together with dry sodium silicate of relatively low soda content and water sufficient to produce a suitable consistency for brushing, spraying or dipping.

5. A "slip" for glazing ceramics comprising the reaction product of silicon carbide containing 5% to 12% free silica with 2% to 3% of sodium silicate of $Na_2O$, $SiO_2$ ratio approximately 1:1, and water sufficient to produce a stiff dough, with 2% to 10% of sodium silicate of $Na_2OSiO_2$ ratio approximately 1:2 and water sufficient to produce a consistency suitable for application by brushing, spraying or dipping.

EDWARD R. STOWELL.